United States Patent
You et al.

(10) Patent No.: US 8,157,292 B2
(45) Date of Patent: Apr. 17, 2012

(54) SEAT BELT DEVICE FOR VEHICLE

(75) Inventors: Byoung-Gae You, Wonju-si (KR); Il Hwan Kim, Ansan-si (KR)

(73) Assignees: Hyundai Motor Company, Seoul (KR); Kia Motors Corporation, Seoul (KR); Autoliv Development AB, Vårgårda (SE)

( * ) Notice: Subject to any disclaimer, the term of this patent is extended or adjusted under 35 U.S.C. 154(b) by 246 days.

(21) Appl. No.: 12/621,936

(22) Filed: Nov. 19, 2009

(65) Prior Publication Data

US 2011/0057432 A1 Mar. 10, 2011

(30) Foreign Application Priority Data

Sep. 4, 2009 (KR) .................. 10-2009-0083641

(51) Int. Cl.
*B60R 22/03* (2006.01)
*B60R 22/26* (2006.01)

(52) U.S. Cl. .................... 280/804; 280/801.1

(58) Field of Classification Search ............ 280/801.1, 280/801.2, 802, 804; 297/468, 481; *B60R 22/03, B60R 22/26*
See application file for complete search history.

(56) References Cited

U.S. PATENT DOCUMENTS

| | | | | |
|---|---|---|---|---|
| 5,236,220 A | * | 8/1993 | Mills | 280/801.1 |
| 5,431,446 A | * | 7/1995 | Czarnecki et al. | 280/802 |
| 6,969,088 B2 | * | 11/2005 | Wang | 280/802 |
| 2003/0075914 A1 | * | 4/2003 | Kohlndorfer et al. | 280/808 |
| 2006/0231317 A1 | * | 10/2006 | Yamaguchi et al. | 180/268 |
| 2007/0096450 A1 | * | 5/2007 | Gyllenspetz et al. | 280/801.1 |

FOREIGN PATENT DOCUMENTS

| | | | |
|---|---|---|---|
| DE | 10 2007 015187 A1 | * | 10/2008 |
| EP | 1693257 A2 | * | 8/2006 |
| JP | 1-72447 U | | 5/1989 |
| JP | 2002-370615 A | * | 12/2002 |
| JP | 2006-298257 A | | 11/2006 |
| JP | 2009-90957 A | | 4/2009 |
| KR | 10-0235656 B1 | | 9/1999 |
| KR | 10-0569544 B1 | | 4/2006 |
| KR | 10-0639981 B1 | | 11/2006 |
| WO | WO 02/074589 A1 | * | 9/2002 |

* cited by examiner

*Primary Examiner* — Ruth Ilan
(74) *Attorney, Agent, or Firm* — Morgan, Lewis & Bockius LLP

(57) ABSTRACT

A seat belt device for a vehicle includes a buckle head mounted on a seat and designed to couple with a tongue and a carriage unit allowing the buckle head to be displaced in horizontal and vertical directions of the seat so that the buckle head and the tongue are easily coupled to or decoupled from each other when a belt is fastened or unfastened. The seat belt device facilitates fastening of a seat belt more conveniently by allowing for the horizontal and vertical displacement of a buckle head.

8 Claims, 2 Drawing Sheets

SEAT BELT DEVICE FOR VEHICLE

CROSS-REFERENCE TO RELATED APPLICATION

The present application claims priority of Korean Patent Application Number 10-2009-0083641 filed on Sep. 4, 2009, the entire contents of which application is incorporated herein for all purposes by this reference.

BACKGROUND OF THE INVENTION

1. Field of the Invention

The present invention relates to a seat belt device for a vehicle, in particular, to one which can further facilitate fastening of a seat belt, which is mounted on the seat, when an occupant wears or takes off the seat belt.

2. Description of Related Art

A vehicle seat is generally provided with a seat belt (also called a safety belt) designed to encircle the chest and/or waist of an occupant in order to prevent the occupant from getting hurt in case of an accident. While various types of seat belts are used, the most common seat belt is equipped with a tongue made of metal, attached to a length of belt webbing, and a buckle head fixed to the seat, and is fastened by fitting the tongue into the buckle head and unfastened by separating the tongue from the buckle head.

Since the buckle head is connected to a piece of webbing attached to the seat, it may be caught under the seat or between seats, which would otherwise cause the use of the seat belt to be inconvenient.

Recently, in order to facilitate belt fastening while solving the foregoing problem, seat belt devices capable of displacing the buckle head have been introduced, Among these devices, a seat belt device having a displaceable buckle head, which can be displaced forward of the seat, is disclosed.

FIG. 1 is a side elevation view illustrating a seat belt apparatus including a conventional forwardly-displaceable buckle head.

As shown in FIG. 1, a buckle head 12 coupled to a carrier 13 is provided on the side of a seat S such that it can be displaced along a screw 15A, One end of the screw 15A is supported by a support member 16, and the other end of the screw 15A is connected to a motor 17 A such that the screw 15A can be rotated forward or backward by the motor 17 A.

Following the rotation of the screw 15A, the carrier 13 can move along the screw 15A, and the buckle head 12 coupled to the carrier 13 can be displaced forward or backward of the seat by the carrier 13.

When the occupant attempts to wear the seat belt, he/she couples a tongue 11 to the buckle head 12 by displacing the buckle head 12 to a position where the seat belt can be properly fastened according to his/her body.

However, the conventional buckle head 12 is displaceable only in the horizontal direction, i.e., forward and backward of the seat, fixed to the carrier 13. Accordingly, the vertical position of the buckle head 12 cannot be adjusted. Furthermore, if the coupling angle of the tongue 11 and the buckle head 12 is not properly set, this configuration may disadvantageously cause belt fastening to be rather inconvenient.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention provide a seat belt device, which can facilitate fastening of a seat belt more conveniently by allowing for the horizontal and vertical displacement of a buckle head.

In an aspect of the invention, the seat belt device for a vehicle may include a buckle head mounted on a seat and designed to couple with a tongue and a carriage unit allowing the buckle head to be displaced in horizontal and vertical directions of the seat so that the buckle head and the tongue are easily coupled to or decoupled from each other when a belt is fastened or unfastened.

The carriage unit may include a screw arranged in the horizontal direction of the seat so as to rotate forward and backward, a slide plate movable following the rotation of the screw, and a buckle strap having a slit. One end of the buckle strap may be hinged to the slide plate and the other end of the buckle strap may be coupled to the buckle head. The carriage unit may also include a connecting plate. One end of the connecting plate may be pivotally connected to the slit of the buckle strap and the other end of the connecting plate may slide in the proceeding direction of the slide plate.

The slit may be an elongated hole, and a connecting rod may protrude from the connecting plate and be fitted into the slit.

The buckle head may be coupled to the buckle strap, inclined at a predetermined angle.

The seat belt device may also include a housing mounted on the seat. The housing has a lower rail guiding the direction of the movement of the slide plate and a an upper rail guiding the direction of the movement of the connecting plate.

The displacement of the connecting plate may be set to be shorter than that of the slide plate.

The seat belt device may also include a motor for rotating the screw.

In another aspect of the invention, the seat belt device for a vehicle may include a buckle head coupling with a tongue of a seat belt, a screw arranged in the horizontal direction of a seat so as to rotate forward and backward, a slide plate movable following the rotation of the screw, and a buckle strap having a slit. One end of the buckle strap is hinged to the slide plate and the other end of the buckle strap is coupled to the buckle head. The seat belt device may also include a connecting plate. One end of the connecting plate may be pivotally connected to the slit of the buckle strap and the other end of the connecting plate may slide in the proceeding direction of the slide plate. The slide plate may displace the buckle head in the horizontal direction, and the buckle strap may displace the buckle head in a vertical direction while being rotated by the connecting plate.

According to various embodiments of the invention, the seat belt device for a vehicle can more facilitate fastening of the seat belt by allowing for the vertical and horizontal displacement of the buckle head.

The seat belt device for a vehicle can improve the layout of the interior of the vehicle by locating the buckle head adjacent to the lower portion of the seat when the seat belt is not worn and displacing the buckle head upwards when the belt is worn.

The methods and apparatuses of the present invention have other features and advantages which will be apparent from or are set forth in more detail in the accompanying drawings, which are incorporated herein, and the following Detailed

DETAILED DESCRIPTION OF THE INVENTION

Figure 1:
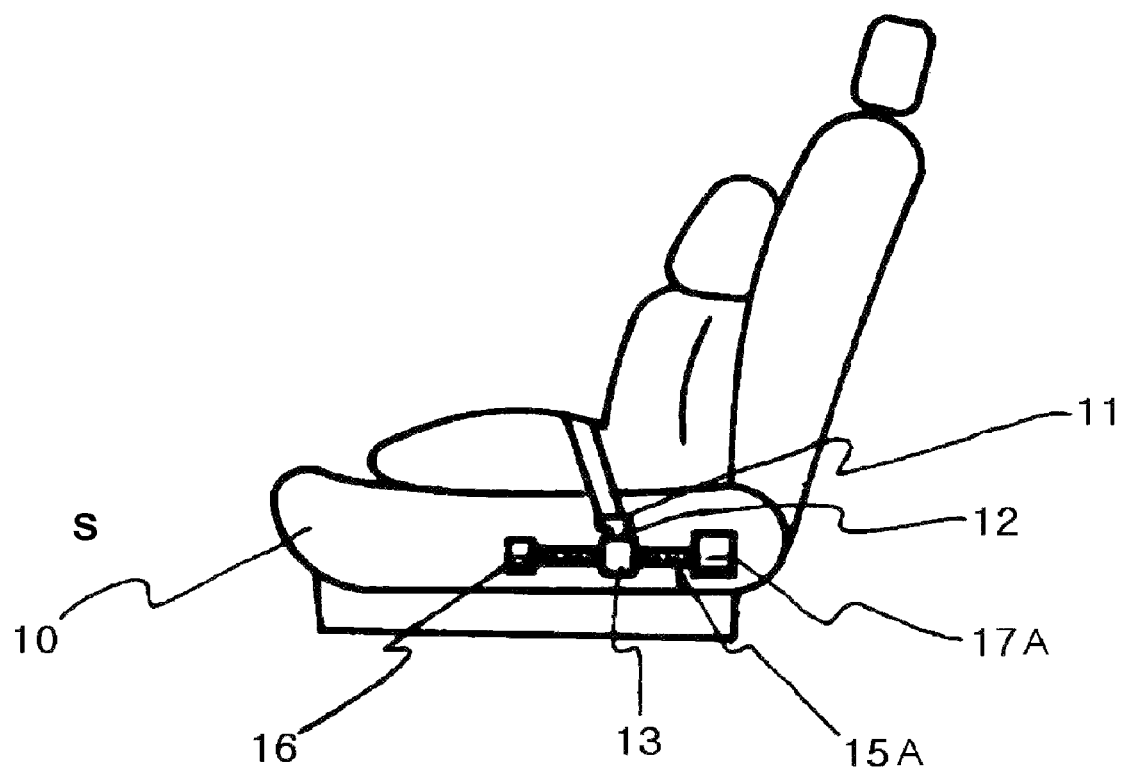
FIG. 1 is a side elevation view illustrating a seat belt apparatus including a conventional forwardly-displaceable buckle head.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following description, the term "horizontal direction" indicates lateral direction in the drawings, i.e., forward and backward direction in the state where an occupant is seated in a vehicle seat, and the term "vertical direction" indicates the direction perpendicular to the horizontal direction.

Figure 2:
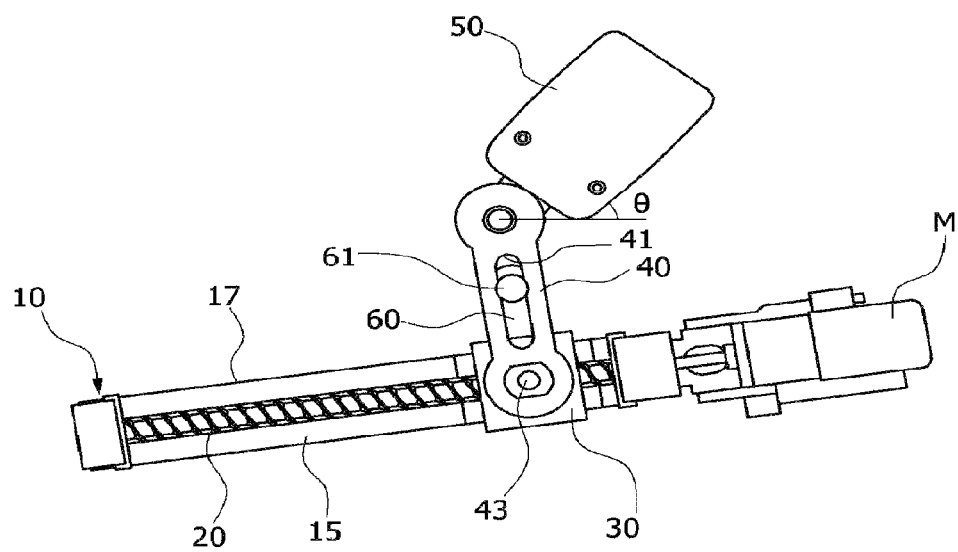
FIG. 2 is a side elevation view illustrating an exemplary seat belt device for a vehicle in accordance with the invention.

FIG. 2 is a side elevation view illustrating a seat belt device for a vehicle in accordance with various embodiments of the invention, and FIGS. 3A through 3C are side elevation views illustrating the horizontal and vertical displacement of a buckle head shown in FIG. 2.

Referring to FIG. 2, the seat belt device 1 for a vehicle in accordance with various embodiments of the invention is mounted on a seat (not shown) such as a driver's seat or a seat next to the driver, and is fastened by fitting a belt tongue (not shown) attached to one end of a length of belt webbing (not shown) into the buckle head 50.

The seat belt device 1 includes the buckle head 50, which is mounted on the seat so as to be fastened with the belt tongue, and a carriage unit, which allows the buckle head 50 to be displaced in the horizontal and vertical directions of the seat so that the buckle head 50 and the tongue can be easily coupled with or decoupled from each other when a belt is fastened or unfastened.

The carriage unit includes a screw 20, a slide plate 30, a buckle strap 40, and a connecting plate 60. The screw 20 is arranged in the horizontal direction of the seat and is rotated by a motor M. The slide plate 30 is coupled to the screw 20 so as to slide in the horizontal direction following the rotation of the screw 20. One end of the buckle strap 40 is hinged to the slide plate 30, and the other end of the buckle strap 40 is coupled to the buckle head 50. One end of the connecting plate 60 is pivotally connected to the buckle strap 40, and the other end of the connecting plate 60 is movable by sliding.

The screw 20 is located inside a housing 10, which is mounted on the seat, with one end of the screw 20 connected to the motor M. With this configuration, the screw 20 can be rotated forward or backward by the motor M to move the slide plate 30 to the left or right (i.e., in the horizontal direction) on the plane of the drawing.

The slide plate 30 is slidably coupled to a lower rail 15, provided in the front part of the housing 10. Thus, the slide plate 30 can be smoothly slide in the horizontal direction along the lower rail 15 when it moves.

The buckle strap 40 coupled to the slide plate 30 is shaped as a link having a predetermined length. One end of the buckle strap 40 is hinged to the slide plate 30, and the other end of the buckle strap 40 is coupled with the buckle head 50. The buckle head 50 can be hinged to the buckle strap 40 so as to pivot at a predetermined angle, or be fixed so as not to move.

The buckle strap 40 has a slit 41 that is an elongated hole extending in the vertical direction. The connecting plate 60 is coupled to the slit 41, and serves to restrict the degree of freedom of the buckle strap 40 while moving inside the slit 41.

A connecting rod 61, protruding from one end of the connecting plate 60, is fitted into the slit 41. The other end of the connecting plate 60 is provided so as to slide in the horizontal direction along an upper rail 17, which is provided in the rear part of the housing 10.

The movable distance of the connecting plate 60 can preferably be set to be shorter than that of the slide plate 30.

For example, as shown in FIG. 3A, the connecting plate 60 is primarily located in the right, ahead of the slide plate 30. When completely moved, the connecting plate 60 is located at the position shown in FIG. 3C. As such, the movable distance of the connecting plate 60 can be limited. Although not illustrated, the slide plate 30 can be further moved to the right end of the screw 20. In contrast, the connecting plate 60 remains in the positions shown in FIGS. 3A through 3C.

The buckle head 50 can be fixedly coupled to the buckle strap 40, inclined at a predetermined angle θ. This is to ensure an angle of easy coupling, i.e., an occupant can easily couple the tongue to the buckle head 50 in this angle. The angle of the buckle head 50 with respect to the coupling position can be properly set since it varies as the buckle head 50 is displaced in the horizontal direction.

Of course, the buckle head 50 can be configured to pivot in a predetermined range of angle instead of being completely fixed to the buckle strap 40. It can also be appreciated that the occupant can adjust the angle of the buckle head 50 when coupling the tongue to the buckle head 50.

Figure 3:
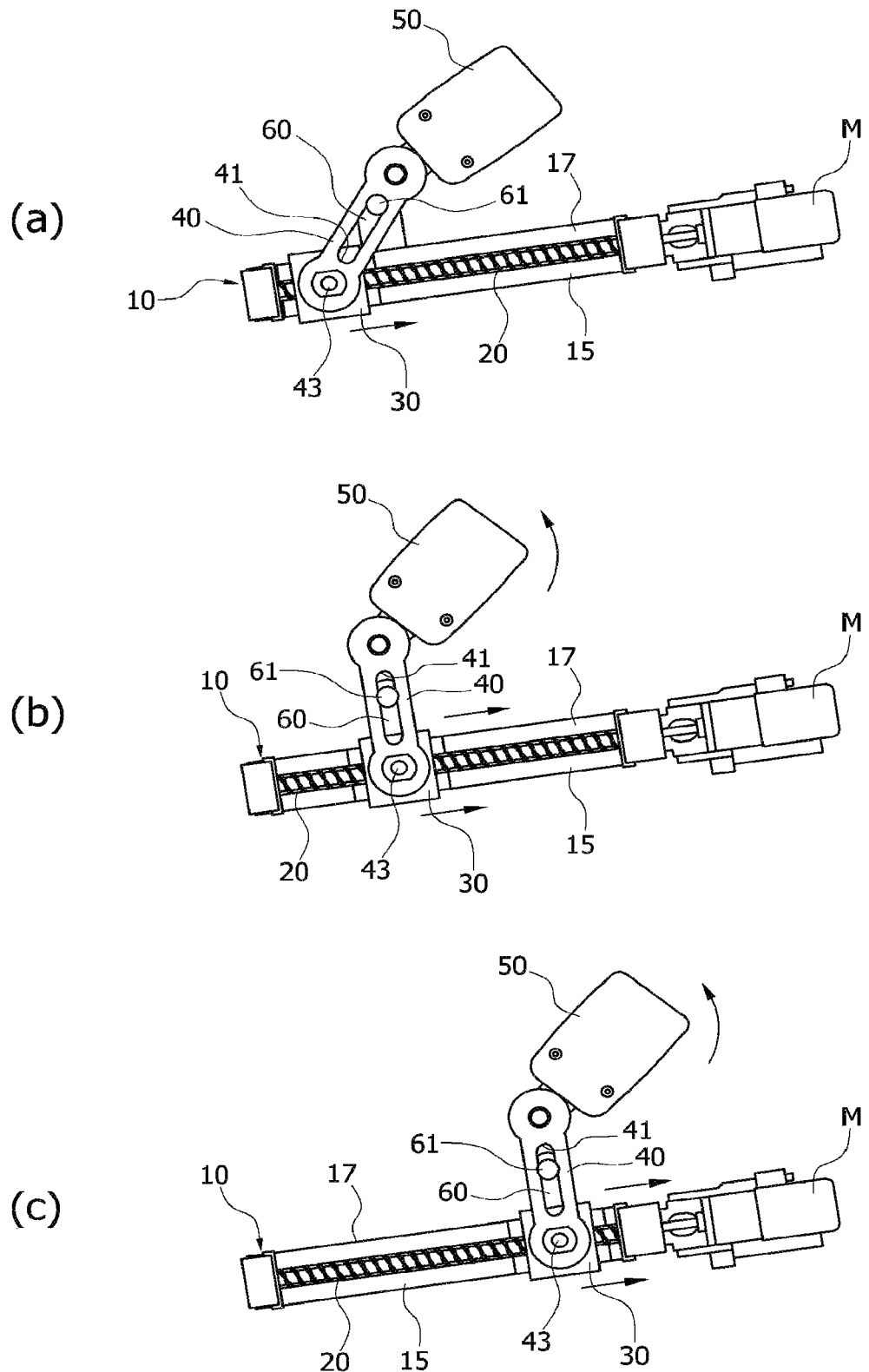
FIGS. 3A through 3C are side elevation views illustrating the horizontal and vertical displacement of a buckle head shown in FIG. 2.

Below, with reference to FIG. 3, a description will be given of the operation of the seat belt device for a vehicle in according to various embodiments of the invention having the above-described construction.

First, as shown in FIG. 3A, before the seat belt is worn, the slide plate 30 is located on the left end of the screw 20, and the connecting plate 60 is located on the right, ahead of the slide plate 30. The buckle strap 40 is inclined to the right by the connecting rod 61 of the connecting plate 30, so that the buckle head 50 is relatively displaced in the vertically downward direction.

Accordingly, in the state where the seat belt is not worn, the buckle head 50 can be located below the seat due to its relative displacement in the vertically downward direction.

When the occupant attempts to wear the seat belt in this state, the motor M is actuated to horizontally move the slide plate 30 to a preset length or a length, which is set by the occupant.

Then, as shown in FIG. 3B, the slide plate 30 overlaps the connecting plate 60 while moving to the right. Afterwards, as shown in FIG. 3C, the slide plate 30 horizontally moves together with the connecting plate 60 along the screw 20.

As the buckle strap 40 is erected, the buckle head 50 is relatively displaced in the vertically upward direction. The buckle head 50 is then reoriented from the previous position, inclined at a predetermined angle, to a new position where it can be easily coupled with the tongue. This indicates that the buckle head 50 is displaced above the seat and is horizontally displaced to an intended position so that the occupant can more easily couple the tongue into the buckle head 50 when fastening the seat belt.

Although not illustrated, the carriage unit can move the slide plate 30 to the left. This operation is the same as the inverse of the above description, and thus a description thereof will be omitted.

The seat belt device for a vehicle in accordance with various embodiments of the invention as described above can further facilitate fastening of the seat belt by allowing for the vertical and horizontal displacement of the buckle head.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A seat belt device for a vehicle, the seat belt device comprising:
    a buckle head mounted on a seat and designed to couple with a tongue; and
    a carriage unit allowing the buckle head to be displaced in horizontal and vertical directions of the seat so that the buckle head and the tongue are easily coupled to or decoupled from each other when an occupant fastens or unfastens a belt,
    wherein the carriage unit includes:
        a screw arranged in a horizontal direction of the seat so as to rotate forward and backward;
        a slide plate movable following the rotation of the screw;
        a buckle strap having a slit, wherein one end of the buckle strap is hinged to the slide plate and the other end of the buckle strap is coupled to the buckle head; and
        a connecting plate, wherein one end of the connecting plate is pivotally connected to the slit of the buckle strap and the other end of the connecting plate is slidable in a proceeding direction of the slide plate.

2. The seat belt device in accordance with claim 1, wherein the slit is an elongated hole, and wherein a connecting rod protruding from the connecting plate is fitted into the slit.

3. The seat belt device in accordance with claim 2, wherein the buckle head is coupled to the buckle strap, inclined at a predetermined angle.

4. The seat belt device in accordance with claim 3, further comprising a housing mounted on the seat, wherein the housing has a lower rail guiding the direction of the movement of the slide plate and an upper rail guiding the direction of the movement of the connecting plate.

5. The seat belt device in accordance with claim 1, wherein a displacement of the connecting plate is set to be shorter than that of the slide plate.

6. The seat belt device in accordance with claim 1, further comprising a motor for rotating the screw.

7. A seat belt device for a vehicle, the seat belt device comprising:
    a buckle head coupling with a tongue of a seat belt;
    a screw arranged in a horizontal direction of a seat so as to rotate forward and backward;
    a slide plate movable following the rotation of the screw;
    a buckle strap having a slit, wherein one end of the buckle strap is hinged to the slide plate and the other end of the buckle strap is coupled to the buckle head; and
    a connecting plate, wherein one end of the connecting plate is pivotally connected to the slit of the buckle strap and the other end of the connecting plate is slidable in a proceeding direction of the slide plate,
    wherein the slide plate displaces the buckle head in a horizontal direction, and the buckle strap displaces the buckle head in a vertical direction while being rotated by the connecting plate.

8. A vehicle seat comprising the seat belt device in accordance with claim 7, wherein the seat belt device is mounted on a lower portion of the seat.

* * * * *